US012759457B2

(12) United States Patent
Hänninen et al.

(10) Patent No.: US 12,759,457 B2
(45) Date of Patent: Oct. 13, 2026

(54) SAFETY SYSTEM

(71) Applicant: INNOTRAFIK OY, Helsinki (FI)

(72) Inventors: Jouni Hänninen, Helsinki (FI); Ilkka Pirttimaa, Helsinki (FI); Johannes Lehtonen, Helsinki (FI)

(73) Assignee: INNOTRAFIK OY, Helsinki (FI)

(*) Notice: Subject to any disclaimer, the term of this patent is extended or adjusted under 35 U.S.C. 154(b) by 0 days.

(21) Appl. No.: 18/877,548

(22) PCT Filed: Jun. 21, 2023

(86) PCT No.: PCT/FI2023/050379
§ 371 (c)(1),
(2) Date: Dec. 20, 2024

(87) PCT Pub. No.: WO2023/247836
PCT Pub. Date: Dec. 28, 2023

(65) Prior Publication Data

US 2025/0376114 A1 Dec. 11, 2025

(30) Foreign Application Priority Data

Jun. 23, 2022 (FI) ...................................... 20225577

(51) Int. Cl.
*B60Q 9/00* (2006.01)

(52) U.S. Cl.
CPC .................................... *B60Q 9/008* (2013.01)

(58) Field of Classification Search
CPC .......... H04B 7/088; H04B 7/02; H04B 7/024; H04B 7/0617; H04B 7/0686;
(Continued)

(56) References Cited

U.S. PATENT DOCUMENTS 8,674,845 B2 * 3/2014 Carter ........................ B60T 7/16 340/426.11
2007/0032245 A1 * 2/2007 Alapuranen ............ H04L 67/12 370/328

(Continued)

FOREIGN PATENT DOCUMENTS

EP 1119777 B1 6/2003
FI 12632 U1 4/2020

(Continued)

OTHER PUBLICATIONS

International Search Report and Written Opinion of the ISA for PCT/FI2023/050379, mailed Oct. 19, 2023, 13 pages.
Search Report for FI20225577, dated Jan. 11, 2023, 2 pages.

*Primary Examiner* — Daniel Previl
(74) *Attorney, Agent, or Firm* — Nixon & Vanderhye PC

(57) ABSTRACT

The safety system includes at least one vehicle unit and at least one counter unit. The counter unit includes at least a radio-signal transceiver (4). The vehicle unit includes a radio-signal transceiver (4), at least two directional antennas (5) directed in a first direction, an omnidirectional antenna (8), and an alarm unit (11). By utilizing the directional antennas (5), the vehicle unit is configured to determine a distance between the vehicle unit and the counter unit. The directional antennas (5) directed in the first direction are arranged at a distance from each other, whereby the vehicle unit is configured, by utilizing the directional antennas (5) in question, to determine a direction of the location of the counter unit in addition to the distance between the vehicle unit and the counter unit. By utilizing the omnidirectional antenna (8), the vehicle unit is configured to determine a distance between the vehicle unit and the counter unit. The alarm unit (11) is configured to produce an alarm when the distance between the vehicle unit and the counter unit, determined by utilizing the directional antennas (5), goes
(Continued)

below a first limit value and the counter unit is located in a sector (6) directed in the direction of the directional antennas (5), and the distance between the vehicle unit and the counter unit, determined by utilizing the omnidirectional antenna (8), goes above a second limit value.

17 Claims, 2 Drawing Sheets

(58) Field of Classification Search
CPC .. H04B 7/0695; H04B 7/06952; H04B 7/086; H04B 17/309; H04B 7/04; H04B 7/0404; H04B 7/0408; H04B 7/0691; H04B 7/0874; H04B 1/38; H04B 7/0456; H04B 7/0626; H04B 7/0639; H04B 7/10; H04B 7/15592; H04W 4/06; H04W 24/10; H04W 36/083; H04W 36/20; H04W 36/302; H04W 36/328; H04W 36/36; H04W 4/02; H04W 4/021; H04W 4/80; H04W 72/23; H04W 84/042; H04W 88/06; H04W 16/28; H04W 24/08; H04W 4/46; H04W 76/15; H04W 4/026; H04W 4/027; H04W 4/33; H04W 16/32; H04W 36/0088; H04W 36/04; H04W 36/304; H04W 84/12; H04W 16/18; H04W 24/02; H04W 24/06; H04W 36/0085; H04W 36/0094; H04W 36/14; H04W 36/38; H04W 4/70; H04W 52/0209; H04W 52/0229; H04W 56/001; H04W 68/02; H04W 72/0446; H04W 72/1215; H04W 72/1263; H04W 72/21; H04W 72/51; H04W 72/52; H04W 74/0808; H04W 76/00; H04W 76/10; H04W 76/11; H04W 76/12; H04W 76/20; H04W 76/22; H04W 76/27; H04W 76/28; H04W 76/30; H04W 76/38; H04W 8/005; H04W 84/005; H04W 84/045; H04W 88/02; H04W 88/08; H04W 92/20; A01K 11/006; B64C 19/00; G06F 21/32; G06F 16/00; G06K 7/10316; G06K 7/10475; G06K 19/0716; G06K 19/0717; G06K 19/077; G06K 19/07773; G06K 19/0723; G06K 19/07749; G06K 7/0008; G06K 7/10009; G06K 7/10178; G06K 7/10366; G06K 19/0775; G06K 19/07758; G06K 19/07779; G06K 19/07786; G06K 7/00; G06K 7/0004; G06Q 10/0631; G06Q 50/00; G06Q 50/02; G06Q 30/0623; G07C 2209/04; G07C 2209/63; G07C 9/20; G07C 9/253; G07C 9/257; G07C 9/29; H01Q 1/243; H01Q 1/3241; H01Q 1/36; H01Q 21/061; H01Q 9/0407; H01Q 1/50; H01Q 1/38; H01Q 1/523; H01Q 9/16; H01Q 21/28; H01Q 19/18; H01Q 21/26; H01Q 21/29; H01Q 21/30; H01Q 23/00; H01Q 25/00; H01Q 3/24; H01Q 3/247; H01Q 5/30; H01Q 5/321; H01Q 9/42; H01Q 1/22; H01Q 21/24; H01Q 1/246; H01Q 1/405; H01Q 1/44; H01Q 1/46; H01Q 1/48; H01Q 21/0075; H01Q 1/2225; H01Q 7/00; H01Q 1/2216; H01Q 19/10; H01Q 19/30; H01Q 21/00; H01Q 21/0006; H01Q 3/26; H01Q 5/49; H01Q 1/2291; H01Q 1/362; B60Q 9/008; G01S 13/42; G01S 13/765; G01S 13/931; G01S 2013/9316; G01S 2013/93271; G01S 2013/93272; G01S 2205/02; G01S 2205/09; G01S 5/0273; G01S 13/56; G01S 13/003; G01S 13/04; G01S 13/536; G01S 13/88; G01S 5/02524; G01S 5/14; G01S 7/415; G08B 21/0263; G08B 21/0266; G08B 13/08; G08B 13/181; G08B 13/187; G08B 29/185; G08G 1/163; G08G 1/166; G08G 1/00; G08G 3/00; G08G 5/00; G08G 9/00; G08G 7/00; G08G 99/00; B64U 10/00; B64U 20/00; B64U 30/00; B64U 40/00; B64U 50/00; B64U 60/00; B64U 70/00; B64U 80/00; B64U 2101/00; B64U 2201/00; B64U 2101/30; B64U 2201/104; G01D 9/007; G01D 1/14; G01D 11/305; G01D 21/02; G01D 9/00; G01D 9/005; G01N 27/126; G01N 27/127; G01N 27/302; G01N 27/00; G01N 27/121; G01N 33/48792; G01N 27/406; G01N 27/06; G01N 27/26; G01N 27/308; G01N 27/4167; G01N 27/12; A61F 13/42; A61F 2013/424; A61F 13/84; A61F 2013/8473; A61F 2013/8479; A61F 2013/8482; A61F 2013/423; F21V 15/02; F21V 29/50; F21V 33/00; F21Y 2115/10; G01L 1/20; G01K 1/024; G01K 3/04; G01V 15/00; G01V 3/12; A61B 5/1113; G01C 21/165; G01C 21/206; G01C 21/1656; G01C 21/20; G01B 7/18; G01M 3/045; G05D 1/0094; G10K 11/28; H04L 1/0041; H04L 1/0057; H04L 1/0075; H04L 1/1854; H04L 12/18; H04L 2001/0097; H04L 43/0823; H04L 5/0007; H04L 5/0053; H04L 5/0055; H04L 5/0094; H04L 5/14; H04L 65/1016; H04L 65/1045; H04L 65/1104; H04L 65/611; H04L 65/613; H04L 67/02; H04L 67/1076; H04R 1/406
USPC ............. 340/435, 539.1, 539.13, 988, 568.5, 340/686.6, 426.11, 825
See application file for complete search history.

(56) References Cited

U.S. PATENT DOCUMENTS

| | | | | |
|---|---|---|---|---|
| 2010/0188248 | A1* | 7/2010 | Sultan | G07C 9/00309 340/12.54 |
| 2010/0289662 | A1 | 11/2010 | Dasilva | |
| 2011/0205033 | A1* | 8/2011 | Bandyopadhyay | G01S 5/0289 340/10.51 |
| 2014/0210646 | A1* | 7/2014 | Subramanya | B61L 29/28 348/148 |
| 2016/0269132 | A1* | 9/2016 | Clark | H01Q 21/205 |
| 2020/0229137 | A1* | 7/2020 | Rubin | H04W 4/46 |
| 2022/0289223 | A1* | 9/2022 | Zhang | B60Q 9/008 |
| 2022/0294495 | A1* | 9/2022 | Chen | H04B 7/0408 |
| 2022/0332285 | A1* | 10/2022 | Sanders | G06F 21/31 |

FOREIGN PATENT DOCUMENTS

| | | | |
|---|---|---|---|
| SE | 1400062 | A1 | 2/2014 |
| SE | 1950882 | A1 | 4/2020 |
| SE | 1950883 | A1 | 1/2021 |
| WO | 2021014303 | A1 | 1/2021 |

* cited by examiner

SAFETY SYSTEM

This application is the U.S. national phase of International Application No. PCT/FI2023/050379 filed Jun. 21, 2023, which designated the U.S. and claims priority to FI patent application No. 20225577 filed Jun. 23, 2022, the entire contents of each of which are hereby incorporated by reference.

BACKGROUND OF THE INVENTION

The invention relates to a safety system and to a method for increasing safety.

Vehicles, such as forklift trucks, and people go around in e.g. warehouses and industrial buildings. Hence, it is important to be able to prevent vehicles from crashing into each other or people.

BRIEF DESCRIPTION OF THE INVENTION

It is an object of the invention to develop a new safety system and method for increasing safety. The solution according to the invention is characterised by what is disclosed in the independent claims. Some embodiments of the invention are disclosed in the dependent claims.

The safety system includes at least one vehicle unit and at least one counter unit. The counter unit includes at least a radio-signal transceiver. The counter unit can be e.g. a personal unit which only includes the transceiver. Furthermore, the counter unit can be e.g. another vehicle unit. The counter unit can also be called a counterpart. The vehicle unit includes a radio-signal transceiver, at least two directional antennas directed in a first direction, an omnidirectional antenna, and an alarm unit. By utilizing directional antennas, the vehicle unit is configured to determine the distance between the vehicle unit and the counter unit. The directional antennas directed in the first direction are arranged at a distance from each other, whereby the vehicle unit is configured, by utilizing the directional antennas in question, to determine the direction of the location of the counter unit in addition to the distance between the vehicle unit and the counter unit. By utilizing the omnidirectional antenna, the vehicle unit is configured to determine the distance between the vehicle unit and the counter unit. The alarm unit is configured to produce an alarm when the distance between the vehicle unit and the counter unit, determined by utilizing the directional antennas, goes below a first limit value and the counter unit is located in a sector directed in the direction of the directional antennas, and the distance between the vehicle unit and the counter unit, determined by utilizing the omnidirectional antenna, goes above a second limit value. In this way, an alarm can be given accurately of the risk of crashing as needed. In addition to the direction, the directional antennas also provide the distance. The omnidirectional antenna is used to detect those counter units which are not in the sector of the directional antennas. The omnidirectional antenna is used e.g. for detecting the driver's own counter unit or the distance of a counter unit located at the side of the vehicle. For example, the driver's counter unit in the cab does not produce an unnecessary alarm, and the counter unit beside a vehicle mainly moving back and forth does not produce an alarm at least when the vehicle remains in place.

According to an embodiment, the vehicle unit is configured to determine the distance between the vehicle unit and the counter unit by measuring the transit time of the signal between the vehicle unit and the counter unit, and the vehicle unit is configured to determine the direction of the location of the counter unit by comparing the transit times of the signals received by different directional antennas. This type of implementation is simple and operationally reliable.

According to an embodiment, between the radio-signal transceiver and the directional antennas of the vehicle unit, there is a connector which is configured to connect the antennas alternately into connection with the transceiver for measuring signal transit times alternately from different antennas. Then, each antenna does not need its own transceiver, that is, the apparatus is reasonably simple. According to an embodiment, the vehicle unit includes another radio-signal transceiver and, in connection with it, at least two directional antennas directed in a second direction opposite in relation to said first direction. In this case, the vehicle unit can detect the counterparts at both front and rear in a specific sector angle.

According to an embodiment, the vehicle unit is configured to adjust said first limit value based on the rate of change of the distance between the vehicle unit and the counter unit. Thus, it is possible to implement that, when the vehicle unit and the counter unit approach each other with a high speed, an alarm is given when the units are farther from each other compared with a situation where the units approach each other with a slower speed. According to an embodiment, it is possible to define a distance limit for producing the alarm in the system by determining a specific time until the possible crash as the limit value. In this way, the limit value of distance can vary in relation to the approach speed. If the alarm limit is set to a specific time value, e.g. 3 seconds, before the crash, when the approach speed is high, the alarm is given as the vehicle unit and the counter unit are farther away from each other than when the approach speed is lower. Then, there is always time to react in order to avoid the crash.

According to an embodiment, the approach speed and/or the distance between the vehicle unit and the counter unit can also affect the type of the alarm sound or some other warning signal. Then, when the approach speed is high, the volume of the alarm is higher than when the approach speed is lower. Furthermore, e.g. when the distance is small, the volume of the given alarm can be higher than when the distance is larger. In practice, this can thus mean that, if the crash is more probable, an alarm of higher volume can be given.

According to an embodiment, the vehicle unit includes a control unit, into which is configurable information on the direction of the vehicle unit and the direction of the counter unit, whereby the control unit is configured to prevent the alarm unit from producing an alarm when the directions show that the vehicle unit and the counter unit will not crash into each other. Then, it is possible to prevent the giving of an alarm e.g. in a situation where the vehicles are running on different parallel aisles beside each other, whereby there is no risk of crashing even though the vehicles are quite close to each other.

According to an embodiment, the safety system contains several vehicle units which are configured to communicate with each other. By such an arrangement, it is possible to convey information from one vehicle unit to another, whereby a lot of information can be conveyed to prevent crashing. Thus, the vehicle unit can include information on e.g. the location and the running direction of several other vehicle units in relation to the vehicle unit in question. Then, alarms can be configured to be given only as necessary and without forming a map of the area being examined with the locations of the vehicle units.

According to an embodiment, the safety system includes at least one fixed support point which comprises a radio-signal transceiver and at least two directional antennas directed in a specific direction. The fixed support point can be utilized e.g. for transmitting signals whereby, if there is material suppressing the transit of the signal between the vehicle unit and the counter unit, the vehicle unit and the counter unit can both communicate with the fixed support point, whereby possible data indicating a risk of crashing can be conveyed by means of it. By using fixed support points, it is also reasonably simple to form a map of the area, where the vehicle units and the counter units are located, if desired.

According to an embodiment, the alarm unit comprises at least two speakers. In this case, a sound alarm can be directed in the direction of the danger. According to an embodiment, the alarm unit comprises at least two speakers in its front section and at least two speakers in its rear section. Such an arrangement can direct the sound in the direction of the danger especially accurately and illustratively.

According to an embodiment, the omnidirectional antenna and the at least two directional antennas directed in the first direction are arranged into connection with the same circuit board. Such an arrangement is compact as well as easy and simple to install in connection with a vehicle.

BRIEF DESCRIPTION OF THE DRAWINGS

The invention will now be described in closer detail in connection with some embodiments and with reference to the accompanying drawings, wherein.

DETAILED DESCRIPTION OF THE INVENTION

Figure 1:
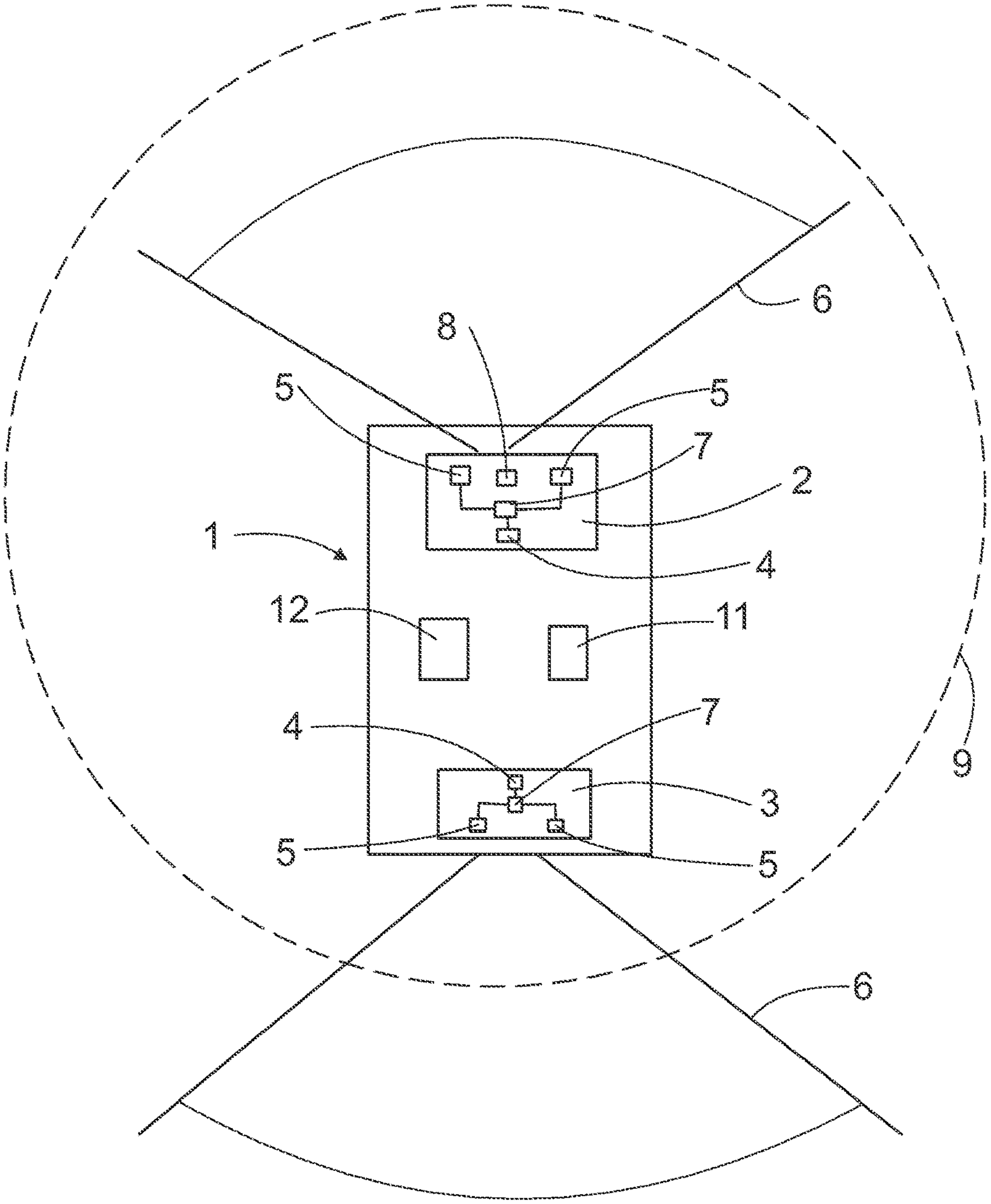
FIG. 1 is a schematic top view of a vehicle equipped with a vehicle unit.

FIG. 1 shows a vehicle 1. The vehicle 1 can be e.g. a moving work machine, such as a forklift truck, or some other work machine used in e.g. warehouses or industrial buildings.

FIG. 1 shows components of a vehicle unit in connection with the vehicle 1. In the embodiment of FIG. 1, the vehicle 1 includes a front unit 2 and a rear unit 3. The front unit 2 includes a radio-signal transceiver 4. The front unit 2 also includes two directional antennas 5 directed in a first direction. A beam of the directional antennas 5 is illustrated in FIG. 1 by a sector 6. Between the radio-signal transceiver 4 and the directional antennas 5 of the front unit 2, there is a connector 7. The connector 7 is configured to connect the antennas 5 alternately into connection with the transceiver 4. By connecting the antennas 5 alternately into connection with the transceiver 4, signal transit times can be measured alternately from different directional antennas 5. Hence, there is no need for two transceivers 4 for measuring the signals passing through the antennas.

The front unit 2 further includes an omnidirectional antenna 8. A beam of the omnidirectional antenna 8 is illustrated in FIG. 1 by a dashed line 9.

The rear unit 3 also includes a radio-signal transceiver 4. The rear unit 3 also includes two directional antennas 5. The directional antennas 5 of the rear unit 3 are directed in a second direction opposite in relation to said first direction. Thus, in connection with the vehicle 1, there are beams 6 of the directional antennas both forwards and backwards.

Between the radio-signal transceiver 4 and the directional antennas 5 of the rear unit 3, there is a also connector 7. The connector 7 is configured to connect the antennas 5 alternately into connection with the transceiver 4. There is no need for an omnidirectional antenna in connection with the rear unit, but it is enough that there is one omnidirectional antenna in connection with the vehicle 1.

In connection with the front and read units, the designations "front" and "rear" are only used to identify the units, but not to define the direction or position of the units. Therefore, if desired, it is possible to locate the front unit at e.g. the rear of the vehicle and its directional antennas can be directed backwards and, equivalently, the rear unit can be located at e.g. the front of the vehicle and its directional antennas can be directed forwards.

Figure 2:
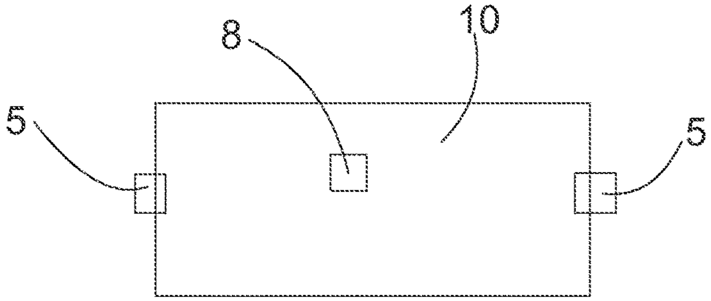
FIG. 2 is a schematic view of a circuit board of the vehicle unit.

The components of the front unit 2 and, equivalently, the components of the rear unit 3 can be located to either the same construction or, then, they can be located separately and only be in a functional connection with each other. FIG. 2 shows a circuit board 10. To the circuit board 10 are connected an omnidirectional antenna 8 and directional antennas 5. The directional antennas 5 can be arranged at the ends of the circuit board 10, whereby they are at a distance from each other. The directional antennas 5 can be arranged at a distance of 100-300 mm, for example, from each other.

In connection with the vehicle 1, there is additionally an alarm unit 11. The alarm unit 11 can be arranged into connection with the front unit 2 or the rear unit 3 or it can be structurally separate from these units. The alarm unit 11 can produce an alarm e.g. by producing an audio signal, a light signal and/or a vibration alarm and/or information visible on a display and/or some other indication suitable for the purpose.

The alarm unit 11 can comprise at least two speakers. In this case, a sound alarm can be directed in the direction of the danger. According to an embodiment, the alarm unit 11 can comprise at least two speakers in its front section and at least two speakers in its rear section. Such an arrangement can direct the alarm sound in the direction of the danger especially accurately and illustratively.

The vehicle unit of FIG. 1 is able to detect the counter unit being close by and to give an alarm if the distance and the direction of the vehicle unit and the counter unit in relation to each other are such that there is a risk of crashing. The counter unit includes at least a radio-signal transceiver. The counter unit can be e.g. a personal unit which only includes the transceiver. Furthermore, the counter unit can be e.g. another vehicle unit.

By utilizing the directional antennas 5, the vehicle unit is configured to determine the distance between the vehicle unit and the counter unit. The distance between the vehicle unit and the counter unit is configured to be determined by measuring signal transit time between the vehicle unit and the counter unit.

The directional antennas 5 are thus arranged at a distance from each other. By utilizing directional antennas 5 in question, the vehicle unit is configured to determine the direction of the location of the counter unit. The vehicle unit is configured to compare the transit times of signals received by different directional antennas 5. When the directional antennas 5 directed in the same direction are at a distance from each other, the direction of the location of the counter unit can be determined by means of differences in the transit time of the signals and the signal strengths.

By utilizing the omnidirectional antenna 8, the vehicle unit is configured to determine the distance between the vehicle unit and the counter unit. The distance between the vehicle unit and the counter unit is configured to be determined by measuring signal transit time between the omnidirectional antenna 8 and the counter unit.

The alarm unit 11 is configured to produce an alarm when the distance between the vehicle unit and the counter unit, determined by utilizing the directional antennas 5, goes below a first limit value and the counter unit is located in a sector 6 directed in the direction of the directional antennas 5, and the distance between the vehicle unit and the counter unit, determined by utilizing the omnidirectional antenna 8, goes above a second limit value. In this way, an alarm can be given accurately of the risk of crashing as needed. The sector 6, which includes the counter unit on which the alarm is given, can be e.g. 120°. The sector in question can also be e.g. larger than 90° and smaller than 170°. For example, the driver's counter unit in the cab is not allowed to produce an unnecessary alarm, and the counter unit next to the vehicle 1 mainly moving back and forth is not allowed to produce an alarm at least when the vehicle 1 remains in place. Unnecessary alarms can be prevented by measuring the distance of the vehicle unit and the counter unit by means of the omnidirectional antenna 8. If then the distance is observed to be small, the counter unit is interpreted to be in the cab or in its immediate vicinity, such as loading the vehicle. If the counter unit approaches the vehicle unit, an alarm on the risk of crashing can be given in this approach stage but, when the counter unit is close enough to the vehicle, the alarm can be stopped.

The vehicle unit can include a control unit 12 which is configured to adjust said first limit value based on the rate of change of the distance between the vehicle unit and the counter unit. When the vehicle unit and the counter unit approach each other with a high speed, an alarm is given when the units are farther from each other than in a situation where the units approach each other with a slower speed.

It is possible to define a distance limit for producing the alarm in the system by determining a specific time until the possible crash as the limit value. In this way, the limit value of distance can vary in relation to the approach speed. If the alarm limit is set to a specific time value, e.g. 3 seconds, before the crash, when the approach speed is high, the alarm is given as the vehicle unit and the counter unit are farther away from each other than when the approach speed is lower. Then, there is always time to react in order to avoid the crash.

Figure 3:
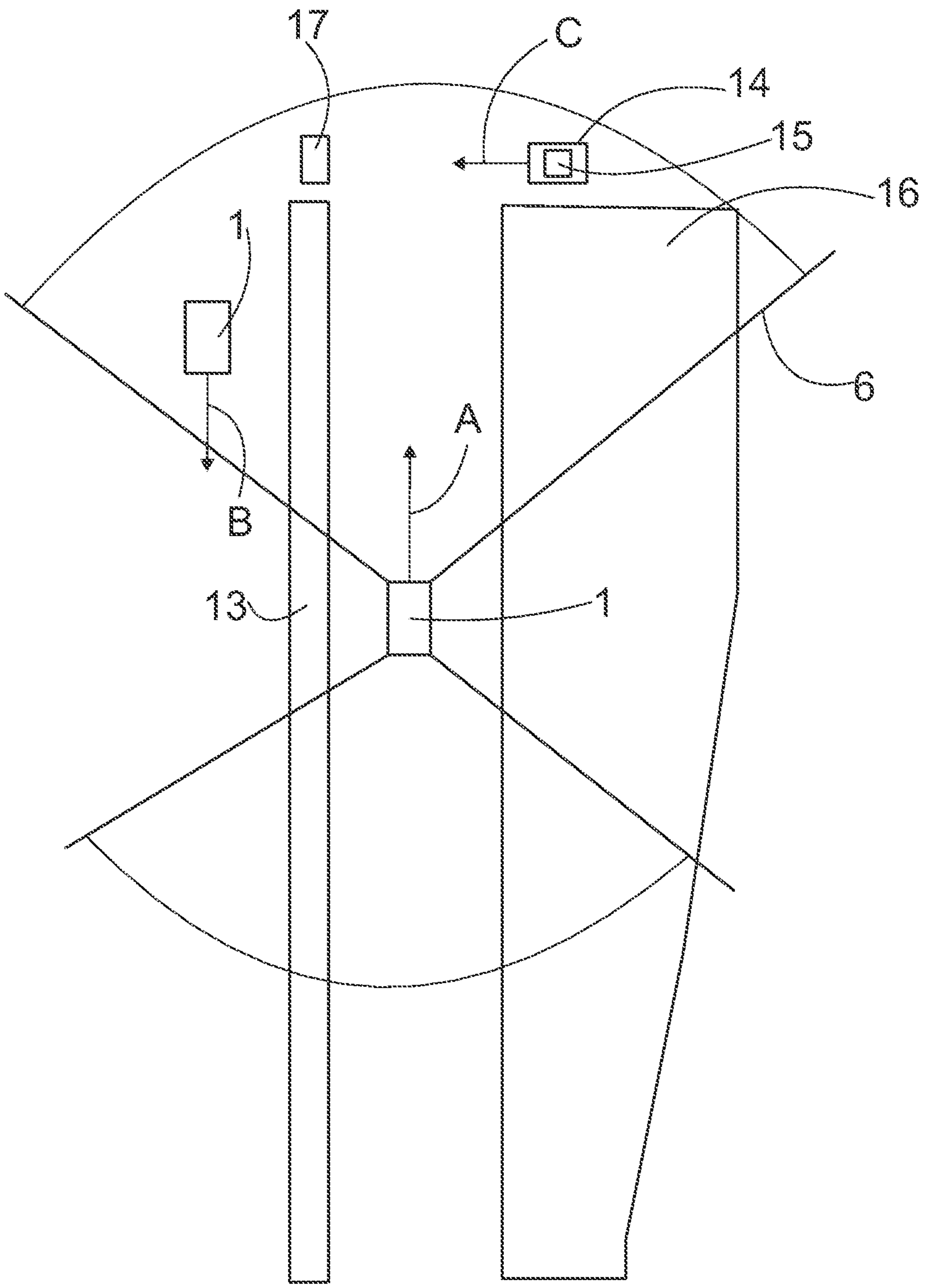
FIG. 3 is a schematic top view of a warehouse equipped with a safety system.

The approach speed and/or the distance between the vehicle unit and the counter unit can also affect the type of the alarm sound or some other warning signal. Then, when the approach speed is high, the volume of the alarm is higher than when the approach speed is lower. Furthermore, e.g. when the distance is small, the volume of the given alarm can be higher than when the distance is larger. In practice, this can thus mean that, if the crash is more probable, an alarm of higher volume can be given. The control unit 12 can be configurable with information on the direction of the vehicle unit and, thus, the vehicle 1 being in connection with it, and the counter unit. Then, the control unit 12 can be configured to prevent the alarm unit 11 from producing an alarm when the directions show that the vehicle unit and the counter unit will not crash. An example of such a situation is illustrated in FIG. 3. The vehicle unit of the vehicle 1 running in the direction of arrow A detects the vehicle running in the direction of arrow B, because a shelf 13 in between them does not prevent the transmit of the signal. Because the vehicle running in the direction of arrow B is in the detection sector 6 and the vehicles are close to each other, it is possible to give an alarm in the situation. However, the control unit has information on the direction A of its own vehicle and the direction B of the other vehicle. Furthermore, the control unit 12 naturally has information on the direction of the vehicle running in the direction of arrow B in relation to the vehicle running in the direction of arrow A. Based on this information, the control unit 12 is able to detect that the vehicles will not crash and, thus, there is no need to implement the alarm. Then, it is possible to prevent the giving of an alarm e.g. in a situation where the vehicles are running on different parallel aisles beside each other, whereby there is no risk of crashing even though the vehicles are quite close to each other.

The different vehicle units of the safety system can be configured to communicate with each other. By such an arrangement, it is possible to convey information from one vehicle unit to another, whereby a lot of information can be conveyed to prevent crashing. Thus, the vehicle unit can include information on e.g. the location and the running direction of several other vehicle units in relation to the vehicle unit in question. Then, alarms can be configured to be given only as necessary and without forming a map of the area being examined with the locations of the vehicle units.

According to an embodiment, in the control unit 12 can be configured information on the direction of the counter unit seen by the vehicle unit, information on the direction of the vehicle unit seen by the counter unit, and information on the change in the mutual distance between the vehicle unit and the counter unit. Then, the control unit 12 can be configured to prevent the alarm unit 11 from producing an alarm when the information shows that the vehicle unit and the counter unit will not crash.

The above arrangement can be described by the following example. A first vehicle unit detects in the detection sector, e.g. at the angle of 30°, of the front unit in its running direction a counter unit, i.e. a second vehicle unit. This second vehicle unit detects in the detection sector, equivalently e.g. at the angle of 30°, of the rear unit in its running direction the above-mentioned first vehicle unit. If the control unit 12 then receives e.g. information on the distance between the vehicle unit and the counter unit not changing, it is then possible to detect that the first and the second vehicle unit run in the same direction or are stationary. In both cases, there is no risk of crashing and, thus the alarm unit 11 is prevented from producing an alarm. The arrangement in question does not require e.g. absolute information on the running direction or speed of the vehicle unit and the counter unit but said relative information is enough.

FIG. 3 also illustrates a situation where a person 14, who carries a personal unit 15, moves in the direction of arrow C. The person 14 is in the detection sector 6 of the vehicle 1 running in the direction of arrow A and close to the vehicle 1 in question. Therefore, the risk of crashing is evident and an alarm must be implemented. However, a wall 16 is such of its thickness and material that it prevents the travel of the signal. The safety system can be implemented to operate e.g. on the UWB frequency 6.5 GHz, whereby audibility through obstacles can be reasonably weak. Then, it is possible that the vehicle unit of the vehicle 1 running in the direction A does not detect the personal unit of the person 14. In order to prevent such an incident, it is possible to configure the safety system with at least one fixed support point 17. The fixed support point 17 can be utilized e.g. for transmitting signals. In this case, the vehicle unit and the counter unit are both in connection with the fixed support point 17 whereby, by means of it, it is possible to transmit possible data on the risk of crashing.

The fixed support point 17 can comprise a radio-signal transceiver and at least two directional antennas directed in a specific direction. The directional antennas in question can be configured in a similar way than described above in connection with the vehicle unit. If the fixed support point is configured with three pairs of directional antennas, the beam of each pair covering 120°, these three pairs can cover 360°. By using the fixed support points 17, it is also reasonably simple to form a map of the area, where the vehicle units and the counter units are located, if desired.

Those skilled in the art will find it obvious that, as technology advances, the basic idea of the invention may be implemented in many different ways. The invention and its embodiments are thus not restricted to the examples described above but can vary within the scope of the claims.

The invention claimed is:

1. A safety system which includes at least one vehicle unit and at least one counter unit, which counter unit includes at least one radio-signal transceiver, which vehicle unit includes a radio-signal transceiver, at least two directional antennas directed in a first direction, whereby the vehicle unit is configured, by utilizing the directional antennas, to determine a distance between the vehicle unit and the counter unit and which directional antennas directed in the first direction are arranged at a distance from each other, whereby the vehicle unit is configured, by utilizing the directional antennas in question, to determine a direction of the location of the counter unit in addition to the distance between the vehicle unit and the counter unit, an omnidirectional antenna, by utilizing which, the vehicle unit is configured to determine a distance between the vehicle unit and the counter unit, and an alarm unit, whereby the alarm unit is configured to produce an alarm when the distance between the vehicle unit and the counter unit, determined by utilizing the directional antennas, goes below a first limit value and the counter unit is located in a sector directed in the direction of the directional antennas, and the distance between the vehicle unit and the counter unit, determined by utilizing the omnidirectional antenna, goes above a second limit value.

2. A safety system according to claim 1, wherein the vehicle unit is configured to determine the distance between the vehicle unit and the counter unit by measuring signal transit time between the vehicle unit and the counter unit, and the vehicle unit is configured to determine the direction of the location of the counter unit by comparing the transit times of the signals received by different directional antennas.

3. A safety system according to claim 2, wherein between the radio-signal transceiver and the directional antennas of the vehicle unit, there is a connector which is configured to connect the antennas alternately into connection with the transceiver in order to measure the transit times of the signal alternately from different antennas.

4. A safety system according to claim 1, wherein the vehicle unit includes a second radio-signal transceiver and, in connection with it, at least two directional antennas directed in a second direction opposite in relation to said first direction.

5. A safety system according to claim 1, wherein the vehicle unit is configured to adjust said first limit value based on the rate of change of the distance between the vehicle unit and the counter unit.

6. A safety system according to claim 1, wherein the vehicle unit includes a control unit, into which is configurable information on the direction of the counter unit seen by the vehicle unit, information on the direction of the vehicle unit seen by the counter unit, and information on the change in the mutual distance of the vehicle unit and the counter unit, whereby the control unit is configured to prevent the alarm unit from producing an alarm when the information shows that the vehicle unit and the counter unit will not crash.

7. A safety system according to claim 1, wherein the alarm unit is configured to give the more intensive alarm the more probable the crash is.

8. A safety system according to claim 1, which contains several vehicle units which are configured to communicate with each other.

9. A safety system according to claim 1, which includes at least one fixed support point which comprises a radio-signal transceiver and at least two directional antennas directed in a specific direction.

10. A safety system according to claim 1, wherein the alarm unit comprises at least two speakers.

11. A safety system according to claim 10, wherein the alarm unit comprises at least two speakers in its front section and at least two speakers in its rear section.

12. A safety system according to claim 1, wherein the omnidirectional antenna and the at least two direction antennas directed in the first direction are arranged into connection with the same circuit board.

13. A method for increasing safety, in which method, employing at least one vehicle unit and at least one counter unit, determining, by utilizing directional antennas of the vehicle unit, a distance between the vehicle unit and the counter unit, determining, by utilizing directional antennas in question, a direction of the location of the counter unit in addition to the distance between the vehicle unit and the counter unit, determining, by utilizing the omnidirectional antenna, a distance between the vehicle unit and the counter unit, and producing an alarm by an alarm unit, when the distance between the vehicle unit and the counter unit, determined by utilizing the directional antennas, goes below a first limit value and the counter unit is located in a sector directed in the direction of the directional antennas, and the distance between the vehicle unit and the counter unit, determined by utilizing the omnidirectional antenna, goes above a second limit value.

14. A method according to claim 13, wherein the vehicle unit including at least two directional antennas and a transceiver, and connecting the antennas alternately into connection with the transceiver in order to measure signal transit times alternately from different antennas.

15. A method according to claim 13, wherein adjusting said first limit value based on the rate of change of the distance between the vehicle unit and the counter unit.

16. A method according to claim 15, wherein defining a distance limit for producing an alarm by determining a specific time until the possible crash as the limit value.

17. A method according to claim 13, wherein obtaining information on the direction of the counter unit seen by the vehicle unit, information on the direction of the vehicle unit seen by the counter unit, and information on the change in the mutual distance of the vehicle unit and the counter unit, and preventing the control unit from producing an alarm when the information shows that the vehicle unit and the counter unit will not crash.

* * * * *